United States Patent [19]

Stewart et al.

[11] Patent Number: 5,382,628
[45] Date of Patent: Jan. 17, 1995

[54] HIGH IMPACT STRENGTH ARTICLES FROM POLYESTER BLENDS

[75] Inventors: Jennifer L. Stewart, Kingsport; Emily T. Bell, Jonesborough, both of Tenn.

[73] Assignee: Eastman Chemical Company, Kingsport, Tenn.

[21] Appl. No.: 203,172

[22] Filed: Feb. 28, 1994

[51] Int. Cl.$^6$ ............................................... C08L 67/02
[52] U.S. Cl. .................... 525/174; 525/173; 525/177; 525/444; 524/539
[58] Field of Search ............... 525/177, 444, 173, 174; 524/539

[56] References Cited

U.S. PATENT DOCUMENTS

| | | | |
|---|---|---|---|
| 4,263,364 | 4/1981 | Seymour et al. | 428/287 |
| 4,572,852 | 2/1986 | Gartland | 525/177 |
| 4,874,809 | 10/1989 | Keep | 525/444 |
| 4,897,448 | 1/1990 | Romance | 525/67 |

OTHER PUBLICATIONS

Research Disclosure 25244, Apr., 1985.

*Primary Examiner*—Patricia A. Short
*Attorney, Agent, or Firm*—John D. Thallemer

[57] ABSTRACT

The present invention relates to thermoformed plastic articles such as frozen food trays which exhibit unexpectedly high impact strength at low temperatures. The articles are obtained from polyester blends containing 88 to 99 weight percent of a poly(ethylene terephthalate) resin and 1 to 12 weight percent of a poly(1,4-cyclohexylenedimethylene terephthalate) resin which contains at least 30 mole percent of 1,4-cyclohexanedimethanol.

9 Claims, No Drawings

HIGH IMPACT STRENGTH ARTICLES FROM POLYESTER BLENDS

FIELD OF THE INVENTION

The present invention relates to thermoformed plastic articles such as frozen food trays which exhibit unexpectedly high impact strength at low temperatures. The articles are obtained from polyester blends containing 88 to 99 weight percent of a poly(ethylene terephthalate) resin and 1 to 12 weight percent of a poly(1,4-cyclohexylenedimethylene terephthalate) resin which contains at least 30 mole percent of 1,4-cyclohexanedimethanol.

BACKGROUND OF THE INVENTION

Polyethylene terephthalate (PET) is widely used as an extrusion and injection-molding resin for the fabrication of various articles for household or industrial use, including appliance parts, containers, and auto parts. Because many of such articles must withstand considerable temperature changes and/or physical abuse, it is customary to blend polyethylene terephthalate with other polymers, such as ionic copolymers of alpha-olefins and polyolefins, to improve its impact resistance as shown by notched Izod impact values. There are advantages, however, in keeping PET as the matrix material in PET/polymer blends and those are to retain tensile strength, flexural modulus, elongation percent, weather resistance and heat deflection temperature.

Polymer blends of PET with polyesters or copolyesters containing 1,4-cyclohexanedimethanol (CHDM) are disclosed in U.S. Pat. Nos. 4,263,364 and 4,897,448, and in Research Disclosure No. 25244. U.S. Pat. No. 4,263,364 discloses reinforced stampable multi-layer sheets prepared from blends of PET and copolymers of poly(1,4-cyclohexylenedimethylene terephthalate). The blends are limited to blends of PET or PCT with greater than 35 weight percent of either copolymers of PET having 5-50 mole percent CHDM, or copolymers of PCT having 20-50 mole percent ethylene glycol.

U.S. Pat. No. 4,897,448 discloses impact modified polyester-polycarbonate blends containing a polyethylene terephthalate type polyester, a poly(1,4-cyclohexylene-dimethylene terephthalate) type polyester, a polycarbonate, and an impact modifier selected from ethylene-propylene rubbers and acrylic core-shell polymers. Research Disclosure No. 25244 discloses blending two polyethylene terephthalate polyesters which are modified with a different mole percent of 1,4-cyclohexanedimethanol.

In contrast, the present inventors have unexpectedly discovered high impact strength films and articles obtained from polyester blends containing polyethylene terephthalate and 1 to 12 weight percent of a polyester or copolyester which contains at least 30 mole percent 1,4-cyclohexanedimethanol.

SUMMARY OF THE INVENTION

Accordingly, one object of the present invention is to provide polyethylene terephthalate/poly(1,4-cyclohexylenedimethylene terephthalate) blends which exhibit improved impact strength.

Another object of the invention is to provide polyethylene terephthalate/poly(1,4-cyclohexylene-dimethylene terephthalate) blends which exhibit excellent mechanical properties such as impact resistance and stress crack resistance and heat resistance, and to provide processes for preparing said blends.

These and other objects are accomplished herein by a shaped article prepared from a polyethylene terephthalate/poly(1,4-cyclohexylenedimethylene terephthalate) blend comprising:

(A) 88 to 99 weight percent of a polyethylene terephthalate resin having an inherent viscosity of 0.4 to 1.2 dl/g comprising
  (1) a dicarboxylic acid component comprising repeat units from at least 95 mole percent terephthalic acid; and
  (2) a diol component comprising repeat units from at least 95 mole percent ethylene glycol, based on 100 mole percent dicarboxylic acid and 100 mole percent diol; and (B) 1 to 12 weight percent of a poly(1,4-cyclohexylenedimethylene terephthalate) resin having an inherent viscosity of 0.4 to 1.2 dl/g which comprises
  (1) a dicarboxylic acid component comprising repeat units from at least 75 mole percent terephthalic acid or dimethyl terephthalate; and
  (2) a diol component comprising repeat units from at least 30 mole percent 1,4-cyclohexanedimethanol, based on 100 mole percent dicarboxylic acid and 100 mole percent diol, wherein the combined weights of (A) and (B) total 100 percent.

DESCRIPTION OF THE INVENTION

The polyester, component (A), of the present invention is a polyethylene terephthalate (PET) resin. The polyethylene terephthalate resin contains repeat units from at least 95 mole percent terephthalic acid and at least 95 mole percent ethylene glycol, based on 100 mole percent dicarboxylic acid and 100 mole percent diol.

The dicarboxylic acid component of the polyester may optionally be modified with up to about 5 mole percent of one or more different dicarboxylic acids other than terephthalic acid or suitable synthetic equivalents such as dimethyl terephthalate. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid are: phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. Polyesters may be prepared from two or more of the above dicarboxylic acids.

It should be understood that use of the corresponding acid anhydrides, esters, and acid chlorides of these acids is included in the term "dicarboxylic acid".

In addition, the polyester, component (A), may optionally be modified with up to about 5 mole percent, of one or more different diols other than ethylene glycol. Such additional diols include cycloaliphatic diols preferably having 6 to 20 carbon atoms or aliphatic diols preferably having 3 to 20 carbon atoms. Examples of such diols to be included with ethylene glycol are: diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)propane. Polyesters may be prepared from two or more of the above diols.

The polyethylene terephthalate resin may also contain small amounts of trifunctional or tetrafunctional comonomers such as trimellitic anhydride, trimethylolpropane, pyromellitic dianhydride, pentaerythritol, and other polyester forming polyacids or polyols generally known in the art.

The polyester, component (A), useful in the practice of this invention is the condensation product of terephthalic acid, usually employed as the dimethyl ester, and ethylene glycol, hereinafter referred to as polyethylene terephthalate or PET. The PET has a melting point (Tm) of about 255° C.±5° C. and a glass transition temperature (Tg) of about 80° C.±5° C. The PET may exhibit a relatively broad molecular weight range as determined by inherent viscosities of from about 0.4 to about 1.2. However, inherent viscosities of from 0.5 to 1.0 are preferred.

A preferred polyester for use in this invention is a crystallized polyethylene terephthalate having an inherent viscosity of 0.90 which is commercially available as TENITE PET 12822 from Eastman Chemical Company.

Component (B) of the present invention is a poly(1,4-cyclohexylenedimethylene terephthalate) resin containing at least 75 mole percent terephthalic acid or dimethyl terephthalate and at least 30 mole percent 1,4-cyclohexanedimethanol, based on 100 mole percent dicarboxylic acid and 100 mole percent diol. The poly(1,4-cyclohexylenedimethylene terephthalate) resin may contain one or more dicarboxylic acids other than terephthalate acid or dimethyl terephthalate, and one or more diols other than 1,4-cyclohexanedimethanol. Thus, the poly(1,4-cyclohexylenedimethylene terephthalate) resin, component (B), may be a polyester or a copolyester, however, the term "polyester" as used herein shall include "copolyesters". The poly(1,4-cyclohexylenedimethylene terephthalate) resins useful as component (B) have an inherent viscosity of 0.4 to 1.2 dl/g. Preferably, the resins have an inherent viscosity of 0.6 to 1.0 dl/g.

The dicarboxylic acid component of the poly-(1,4-cyclohexylenedimethylene terephthalate) resin may optionally be modified with up to 25 mole percent of one or more different dicarboxylic acids other than terephthalic acid or suitable synthetic equivalents such as dimethyl terephthalate. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid are: phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. Polyesters may be prepared from two or more of the above dicarboxylic acids.

It should be understood that use of the corresponding acid anhydrides, esters, and acid chlorides of these acids is included in the term "dicarboxylic acid".

In addition, the poly(1,4-cyclohexylenedimethylene terephthalate) resin, component (B), may optionally be modified with up to 70 mole percent, of one or more different diols other than 1,4-cyclohexanedimethanol. Such additional diols include cycloaliphatic diols preferably having 6 to 20 carbon atoms or aliphatic diols preferably having 2 to 20 carbon atoms. Examples of such diols to be included with 1,4-cyclohexane-dimethanol are: ethylene glycol, diethylene glycol, triethylene glycol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis(4-hydroxypropoxyphenyl)-propane. Polyesters may be prepared from two or more of the above diols.

Preferably, the dicarboxylic acid portion either consists of 100 mole percent terephthalic acid (or dimethyl terephthalate), or the dicarboxylic acid portion consists of 95 mole percent terephthalic acid (or dimethyl terephthalate) and 5 mole percent isophthalic acid. Preferably, the diol portion consists of 100 mole percent 1,4-cyclohexanedimethylene.

The polyesters, components (A) and (B), of the present invention can be prepared by conventional polycondensation procedures well-known in the art. Such processes include direct condensation of the dicarboxylic acid(s) with the diol(s) or by ester interchange using a dialkyl dicarboxylate. For example, a dialkyl terephthalate such as dimethyl terephthalate is ester interchanged with the diol(s) at elevated temperatures in the presence of a catalyst. Depending on the degree of polymerization, the polyesters may also be subjected to solid state polymerization methods.

The process for preparing the polyethylene terephthalate/poly(1,4-cyclohexylenedimethylene terephthalate) blends of the present invention involves preparing the polyester resins by the process as mentioned previously. The polyester resins are then dried in an atmosphere of dried air or dried nitrogen, or under reduced pressure. The polyester resins are mixed and subsequently melt compounded, for example, in a single or twin screw extruder. Melt temperatures typically will be in the range of 275°–325° C. After completion of the melt compounding, the extrudate is withdrawn in a film or sheet form.

The range of composition of the blends is from 88 to 99 weight percent polyethylene terephthalate and 1 to 12 weight percent poly(1,4-cyclohexylenedimethylene terephthalate) resin. The use of greater than 12 weight percent of the poly(1,4-cyclohexylenedimethylene terephthalate) resin results in undesirable levels of haze and also destroys the ability of the film to be crystallized. The preferred compositional range is from 92 to 95 weight percent polyethylene terephthalate and 5 to 8 weight percent poly(1,4-cyclohexylenedimethylene terephthalate) resin.

The blends of this invention serve as excellent starting materials for the production of shaped articles of all kinds, especially thermoformed articles such as cups and food trays. Additionally, the blends are useful in the form of a film for applications such as blister packaging and lidding film.

Additives such as nucleating agents are useful to crystallize the blends of the present invention. The nucleating agent is added in an amount of 0.01 to 5 weight percent of the composition. Nucleating agents which may be added include polyolefins such as low density polyethylene, high density polyethylene, polypropylene, polybutene, and polymethyl pentene. Inorganic nucleating agents may be used. Such inorganic nucleating agents include $TiO_2$, talc, calcium carbonate, $SiO_2$, carbon black and zeolites. A particularly useful nucleating agent is linear low density poly(ethylene) having a melt flow rate from 1 to 3 g/10 minutes.

In addition, other additives may be combined with the blends of the present invention which include: impact modifiers, fillers, stabilizers, antioxidants, buffers, colorants, dyes, and pigments. Such additives, their amounts, and their use are well known in the art.

The materials and testing procedures used for the results shown herein are as follows:

Impact Strength of the extruded film was determined using ASTM D3763 Instrumented Impact Strength method.

Inherent viscosity (I.V.) was measured at 23° C. using 0.50 grams of polymer per 100 ml of a solvent consisting of 60% by weight phenol and 40% by weight tetrachloroethane.

The following polyesters were used in the examples and are available from Eastman Chemical Company:
A) Poly(ethylene terephthalate), Tenite PET 10388 or PET 12822;
B) Poly(ethylene terephthalate) modified with 31 mole % 1,4-cyclohexanedimethanol, PETG 6763;
C) Poly(cyclohexylenedimethylene terephthalate) modified with 34 mole % ethylene glycol, PCTG 5445;
D) Poly(cyclohexylenedimethylene terephthalate) modified with 19 mole % ethylene glycol, PCTG 10179;
E) Poly(cyclohexylenedimethylene terephthalate) modified with 5 mole % isophthalic acid, PCTA 6761;
F) Poly(cyclohexylenedimethylene terephthalate) modified with 17 mole % isophthalic acid, Kodar A150; and
G) Poly(cyclohexylenedimethylene terephthalate), PCT 3879.

The process of the present invention will be further illustrated by a consideration of the following examples, which are intended to be exemplary of the invention. All parts and percentages in the examples are on a weight basis unless otherwise stated.

EXAMPLE 1

Preparation of a Film from PET Homopolymer

A homopolymer of crystallized polyethylene terephthalate having an I.V. of 0.90 was dried at 150° C. for 16 hours in desiccant air with a dew point $\leq -29°$ C. The PET was placed in the hopper, under dry $N_2$, of a Killion single-screw extruder at 280° C. and extruded into sheet of approximately 25-mil thickness. The casting roll was maintained at a surface temperature of approximately 65° C. to effectively quench the film. The film was tested for crystallinity by differential scanning calorimetry (DSC) methods.

Impact Strength results were obtained from 10 replicate samples of the composition run at 23° C. and −40° C. The average fracture energy of the 10 replicates was determined, and the percentage of specimens which failed in a ductile or puncture mode (as opposed to brittle failure) was recorded. The test results are summarized in Table I.

EXAMPLE 2

Preparation of a Film from PET Modified with 66 Mole % 1,4-cyclohexanedimethanol A copolymer of poly(ethylene terephthalate) modified with 31 mole % 1,4-cyclohexanedimethanol having an I.V. of 0.75 was dried at 70° C. for 16 hours in desiccant air with a dew point $\leq -29°$ C. The copolymer was placed in the hopper, under dry $N_2$, of a Killion single-screw extruder at 260° C. and extruded into sheet of approximately 25-mil thickness. Film was prepared and analyzed as in Example 1. The test results of the amorphous test specimen are summarized in Table I.

EXAMPLES 3–5

Preparation of Films from Blends

Blends of 2, 5 and 10 weight percent of a copolymer of poly(ethylene terephthalate) modified with 31 mole % 1,4-cyclohexanedimethanol which was used in Example 2 was mixed with the PET polyester of Example 1. The mixture was melt blended in a Killion single-screw extruder at 280° C. and cast into films of approximately 25-mil thickness. Films were prepared and analyzed as in Example 1. The test results of the amorphous test specimens are summarized in Table I.

TABLE I

| | Poly(ethylene Terephthalate)/Copolyester Blends | | | |
| | | | Amorphous State | |
| Example | Wt. % PET 10388 | Wt. % PETG 6763 | Average Fracture Energy @ −40° C. (ft-lb) | % Ductile Failure |
| --- | --- | --- | --- | --- |
| 1 | 100 | 0 | 1.27 | 10 |
| 2 | 0 | 100 | 6.41 | 100 |
| 3 | 98 | 2 | 2.80 | 40 |
| 4 | 95 | 5 | 2.97 | 40 |
| 5 | 90 | 10 | 3.22 | 50 |

The results in Table I clearly indicate that the fracture energy of the amorphous blends at −40° C. is increased by the addition of the CHDM-containing polyester far beyond what would be expected from a linear interpolation of the two neat polymers. In addition, the mode of failure in the test specimens is increased to a much higher percentage of ductile failures with the addition of the CHDM-containing polyester resin than would be expected from a plot of the endpoints of the polyethylene terephthalate and the poly(1,4-cyclohexylenedimethylene terephthalate) separately.

EXAMPLES 6–10

Examples 6–10 were prepared according to the procedure set forth in Examples 3–5. Example 6 is a film of neat PET 10388 homopolymer poly(ethylene terephthalate) and Example 7 is a neat film of a CHDM-containing copolyester PCTG 5445.

Examples 8–10 show the effect of blending 2, 5, and 10 wt % of the CHDM-containing copolyester PCTG 5445 with the PET 10388 homopolymer. The extruded films were allowed to crystallize by placing the film in a forced air oven at 160° C. for 20 minutes. Impact Strength was determined at 23° C. The level of crystallinity developed in the films was determined by DSC to contain essentially the same level of crystallinity (between 30 and 35 wt %) as the PET homopolymer. The test results are summarized in Table II.

TABLE II

Poly(ethylene Terephthalate)/Copolyester PCTG 5445 Blends

| Example | Wt. % PET 10388 | Wt. % PCTG 5445 | Amorphous Average Fracture Energy @ −40° C. (ft-lb) | % Ductile Failure | Crystallized Average Fracture Energy @ 23° C. (ft-lb) |
| --- | --- | --- | --- | --- | --- |
| 6 | 100 | 0 | 1.27 | 10 | 0.74 |
| 7 | 0 | 100 | 6.96 | 100 | 0.34 |
| 8 | 98 | 2 | 1.48 | 10 | 0.76 |
| 9 | 95 | 5 | 2.06 | 20 | 1.18 |
| 10 | 90 | 10 | 4.07 | 60 | 1.35 |

The results in Table II clearly show that the fracture energy of the blends at −40° C. and 23° C. and the percentage of ductile failures is increased by the addition of the CHDM-containing polyester far beyond what would be expected from a linear interpolation of the two neat polymers. In addition, the mode of failure in the test specimens is increased to a much higher percentage of ductile failures with the addition of the CHDM-containing polyester resin than would be expected from a plot of the endpoints of the polyethylene terephthalate and the poly(1,4-cyclohexylenedimethylene terephthalate) separately.

EXAMPLES 11-15

Examples 11-15 were prepared according to the procedure previously described in Examples 3-5. Example 11 is a film of the neat PET 10388 control and Example 12 is a neat film of a CHDM-containing copolyester PCTG 10179. Examples 13-15 show the effect of blending 2, 5, and 10 wt % of the CHDM-containing polyester PCTG 10179 with the PET. The extruded films were also allowed to crystallize by placing the film in a forced air oven at 160° C. for 20 minutes. Impact Strength was determined at 23° C. The test results are summarized in Table III.

TABLE III

Poly(ethylene Terephthalate)/Copolyester PCTG 10179 Blends

| Example | Wt. % PET 10388 | Wt. % PCTG 10179 | Amorphous Average Fracture Energy @ −40° C. (ft-lb) | % Ductile Failure | Crystallized Average Fracture Energy @ 23° C. (ft-lb) | % Ductile Failure |
| --- | --- | --- | --- | --- | --- | --- |
| 11 | 100 | 0 | 1.27 | 10 | 0.74 | 0 |
| 12 | 0 | 100 | 5.62 | 100 | 2.91 | 60 |
| 13 | 98 | 2 | 1.98 | 20 | 0.93 | 0 |
| 14 | 95 | 5 | 4.24 | 70 | 1.44 | 10 |
| 15 | 90 | 10 | 4.75 | 80 | 3.29 | 60 |

The results in Table III clearly indicate that the fracture energy of the blends at −40° C. and 23° C. and the percentage of ductile failure is increased by the addition of the CHDM-containing polyester far beyond what would be expected from the linear interpolation of the two neat polymers. In addition, the mode of failure in the test specimens is increased to a much higher percentage of ductile failures with the addition of the CHDM-containing polyester resin than would be expected from a plot of the endpoints of the polyethylene terephthalate and the poly(1,4-cyclohexylenedimethylene terephthalate) separately.

EXAMPLES 16-20

Examples 16-20 were prepared according to the procedure previously described in Examples 1-5. Example 16 is a film of the neat PET 10388 control and Example 17 is a neat film of a CHDM-containing polyester PCT 3879. Examples 18-20 are blends containing 2, 5, and 10 wt % of the CHDM-containing polyester PCT 3879 with the PET. The extruded films were allowed to crystallize by placing the film in a forced air oven at 160° C. for 20 minutes. Impact Strength was determined at 23° C. The test results are summarized in Table IV.

TABLE IV

Poly(ethylene Terephthalate)/Polyester PCT 3879 Blends

| Example | Wt. % PET 10388 | Wt. % PCT 3879 | Amorphous Average Fracture Energy @ −40° C. (ft-lb) | % Ductile Failure | Crystallized Average Fracture Energy @ 23° C. (ft-lb) | % Ductile Failure |
| --- | --- | --- | --- | --- | --- | --- |
| 16 | 100 | 0 | 1.27 | 10 | 0.74 | 0 |
| 17 | 0 | 100 | 6.61 | 100 | 4.74 | 100 |
| 18 | 98 | 2 | 2.72 | 40 | 2.33 | 40 |
| 19 | 95 | 5 | 5.05 | 90 | 2.71 | 40 |
| 20 | 90 | 10 | 4.82 | 80 | 3.92 | 80 |

The test results in Table IV clearly show that the fracture energy of the blends at −40° C. and 23° C. and the percentage of ductile failure is increased by the addition of the CHDM-containing polyester far beyond what would be expected from the linear interpolation of the two neat polymers. In addition, the mode of failure in the test specimens is increased to a much higher percentage of ductile failures with the addition of the CHDM-containing polyester resin than would be expected from a plot of the endpoints of the polyethylene terephthalate and the poly(1,4-cyclohexylenedimethylene terephthalate) separately.

EXAMPLES 21-25

Examples 21-25 were prepared according to the procedure previously described in Examples 1-5. Example 21 is a film of the neat PET 10388 control and Example 22 is a neat film of a CHDM-containing copolyester PCTA 6761. Examples 23-25 are blends of 2, 5, and 10 wt % of the CHDM-containing copolyester PCTA 6761 with the PET. The extruded films were allowed to crystallize by placing the film in a forced air oven at 160° C. for 20 minutes. Impact Strength was determined at 23° C. The test results are summarized in Table V.

TABLE V

| | Poly(ethylene Terephthalate)/Copolyester PCTA 6761 Blends | | | | | |
|---|---|---|---|---|---|---|
| | | | Amorphous | | Crystallized | |
| Example | Wt. % PET 10388 | Wt. % PCTA 6761 | Average Fracture Energy @ −40° C. (ft-lb) | % Ductile Failure | Average Fracture Energy @ 23° C. (ft-lb) | % Ductile Failure |
| 21 | 100 | 0 | 1.27 | 10 | 0.74 | 0 |
| 22 | 0 | 100 | 8.01 | 100 | 5.85 | 100 |
| 23 | 98 | 2 | 4.31 | 70 | 1.56 | 20 |
| 24 | 95 | 5 | 3.40 | 50 | 2.61 | 40 |
| 25 | 90 | 10 | 5.91 | 100 | 4.03 | 70 |

The results in Table V clearly show that the fracture energy of the blends at −40° C. and 23° C. and the percentage of ductile failures is increased by the addition of the CHDM-containing copolyester far beyond what would be expected from the linear interpolation of the two neat polymers. In addition, the mode of failure in the test specimens is increased to a much higher percentage of ductile failures with the addition of the CHDM-containing polyester resin than would be expected from a plot of the endpoints of the polyethylene terephthalate and the poly(1,4-cyclohexylenedimethylene terephthalate) separately.

EXAMPLES 26-30

Examples 26-30 were prepared according to the procedure previously described in Examples 1-5. Example 26 is a film of the neat PET 10388 control and Example 27 is a neat film of a CHDM-containing copolyester Kodar A150. Examples 28-30 are blends of 2, 5, and 10 wt % of the CHDM-containing copolyester Kodar A150 with the PET. The extruded films were allowed to crystallize by placing the film in a forced air oven at 160° C. for 20 minutes. Impact Strength was determined at 23° C. The test results are summarized in Table VI.

TABLE VI

| | Poly(ethylene Terephthalate)/Copolyester Kodar A150 Blends | | | | | |
|---|---|---|---|---|---|---|
| | | | Amorphous | | Crystallized | |
| Example | Wt. % PET 10388 | Wt. % Kodar A150 | Average Fracture Energy @ −40° C. (ft-lb) | % Ductile Failure | Average Fracture Energy @ 23° C. (ft-lb) | % Ductile Failure |
| 26 | 100 | 0 | 1.27 | 10 | 0.74 | 0 |
| 27 | 0 | 100 | 6.82 | 100 | 4.45 | 80 |
| 28 | 98 | 2 | 3.39 | 50 | 1.24 | 10 |
| 29 | 95 | 5 | 5.42 | 100 | 3.21 | 60 |
| 30 | 90 | 10 | 5.07 | 90 | 2.46 | 40 |

The test results in Table VI clearly show that the fractional energy of the blends at −40° C. and 23° C. and the percentage of ductile failure is increased by the addition of the CHDM-containing copolyester far beyond what would be expected from the linear interpolation of the two neat polymers. In addition, the mode of failure in the test specimens is increased to a much higher percentage of ductile failures with the addition of the CHDM-containing polyester resin than would be expected from a plot of the endpoints of the polyethylene terephthalate and the poly(1,4-cyclohexylenedimethylene terephthalate) separately.

EXAMPLES 31 AND 32

Frozen Food Trays

Examples 31 and 32 were prepared according to the procedure previously described in Examples 3-5 on an MPM single screw extruder and extruded into films of 30-mil thickness. The films were thermoformed using a Hydro-Trim laboratory scale thermoformer using a mold heated to 160° C. to crystallize the blend into the shape of a tray with thickness of approximately 25 mils. The bottom of the trays were utilized for impact testing at −20° C. test temperature. Example 31 was a control article containing 97 wt % PET 12822 and 3 wt % of a nucleator concentrate. The nucleator concentrate was composed of 86.6 weight percent of linear low density poly(ethylene), 11.7 weight percent thermo-oxidative stabilizers, and 1,7 weight percent titanium dioxide ($TiO_2$). Example 32 was an article formed from a blend containing 87 wt % PET 12822+10 wt % Thermx 6761+3 wt % of the linear low density poly(ethylene) nucleator concentrate and shows the effect of adding a low level of CHDM-containing polyester.

The average fracture energy of the control Example 31 at −20° C. was 1.61 ft-lb with 10% ductile failures. The average fracture energy at −20° C. of Example 32 containing a low level of Thermx 6761 was 2.87 ft-lb and exhibited 30% ductile failures. Thus, the fracture energy of the blend, Example 32, at −20° C. and the percentage of ductile failure is increased by the addition of the CHDM-containing copolyester blend. In addition, the nucleator concentrate enhanced the crystallinity of the article.

Many variations will suggest themselves to those skilled in this art in light of the above detailed description. All such obvious modifications are within the full intended scope of the appended claims.

What is claimed is:

1. A shaped plastic article prepared from a polyethylene terephthalate/poly (1,4-cyclohexylenedimethylene terephthalate) blend consisting essentially of:
   (A) 88 to 99 weight percent of a polyethylene terephthalate resin having an inherent viscosity of 0.4 to 1.2 dl/g comprising
      (1) a dicarboxylic acid component comprising repeat units from at least 95 mole percent terephthalic acid; and
      (2) a diol component comprising repeat units from at least 95 mole percent ethylene glycol, based on 100 mole percent dicarboxylic acid and 100 mole percent diol; and
   (B) 1 to 12 weight percent of a poly(1,4-cyclohexylenedimethylene terephthalate) resin having an inherent viscosity of 0.4 to 1.2 dl/g which comprises
      (1) a dicarboxylic acid component comprising repeat units from at least 75 mole percent terephthalic acid or dimethyl terephthalate; and
      (2) a diol component comprising repeat units from at least 30 mole percent 1,4-cyclohexanedimethanol, based on 100 mole percent dicarboxylic acid and 100 mole percent diol, wherein the combined weights of (A) and (B) total up to 100 percent.

2. The article of claim 1 which additionally contains 0.01 to 5 weight percent of a nucleating agent.

3. The article of claim 2 wherein the nucleating agent is present in an amount of 2.5 to 3.5 weight percent.

4. The article of claim 2 wherein the nucleating agent is linear low density poly(ethylene).

5. A shaped plastic article prepared from a polyethylene terephthalate/poly(1,4-cyclohexylenedimethylene terephthalate) blend consisting essentially of:
   (A) 90 to 95 weight percent of a polyethyleneterephthaiate resin having an inherent viscosity of 0.4 to 1.2 dl/g which comprises
      (1) a dicarboxylic acid component consisting essentially of repeat units from terephthalic acid; and
      (2) a diol component consisting essentially of repeat units from ethylene glycol; and
   (B) 5 to 10 weight percent of a poly(1,4-cyclohexylene-dimethylene terephthalate) resin having an inherent viscosity of 0.4 to 1.2 dl/g which comprises
      (1) a dicarboxylic acid component comprising repeat units from at least 95 mole percent terephthalic acid or dimethyl terephthalate; and
      (2) a diol component comprising repeat units from at least 95 mole percent 1,4-cyclohexanedimethanol, based on 100 mole percent dicarboxylic acid and 100 mole percent diol, wherein the combined weights of (A) and (B) total up to 100 percent.

6. A shaped plastic article prepared from a polyethylene terephthalate/poly(1,4-cyclohexylenedimethylene terephthalate) blend consisting essentially of:
   (A) 90 to 95 weight percent of a polyethylene terephthalate resin having an inherent viscosity of 0.4 to 1.2 dl/g consisting essentially of
      (1) a dicarboxylic acid component consisting essentially of repeat units from terephthalic acid; and
      (2) a diol component consisting essentially of repeat units from ethylene glycol; and
   (B) 5 to 10 weight percent of a poly(1,4-cyclohexylenedimethylene terephthalate) resin having an inherent viscosity of 0.4 to 1.2 dl/g consisting essentially of
      (1) a dicarboxylic acid component consisting essentially of repeat units from 93 to 97 mole percent terephthalic acid or dimethyl terephthalate and 3 to 7 mole percent isophthalic acid; and
      (2) a diol component consisting essentially of repeat units from 1,4-cyclohexanedimethanol, based on 100 mole percent dicarboxylic acid and 100 mole percent diol, wherein the combined weights of (A) and (B) total UP to 100 percent.

7. The article of claim 6 which additionally contains 0.01 to 5 weight percent of a nucleating agent.

8. The article of claim 7 wherein the nucleating agent is present in an amount of 2.5 to 3.5 weight percent.

9. The article of claim 7 wherein the nucleating agent is linear low density poly(ethylene).

* * * * *